(12) United States Patent
Pieri et al.

(10) Patent No.: US 12,067,909 B2
(45) Date of Patent: Aug. 20, 2024

(54) ELECTRONIC DEVICES WITH DYNAMIC BRIGHTNESS RANGES FOR PASSTHROUGH DISPLAY CONTENT

(71) Applicant: Apple Inc., Cupertino, CA (US)

(72) Inventors: Elizabeth Pieri, Campbell, CA (US);
Teun R Baar, Utrecht (NL); Alexander G Berardino, San Francisco, CA (US);
David M Cook, Broomfield, CO (US);
Peng Liu, San Jose, CA (US); Zuo Xia, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/490,679

(22) Filed: Oct. 19, 2023

(65) Prior Publication Data
US 2024/0203306 A1    Jun. 20, 2024

Related U.S. Application Data

(60) Provisional application No. 63/433,288, filed on Dec. 16, 2022.

(51) Int. Cl.
*G09G 3/00*    (2006.01)
*G02B 27/01*    (2006.01)

(52) U.S. Cl.
CPC ........... *G09G 3/002* (2013.01); *G02B 27/017* (2013.01); *G02B 27/0172* (2013.01); *G09G 2320/0626* (2013.01)

(58) Field of Classification Search
CPC ........... G09G 3/002; G09G 2320/0626; G02B 27/017; G02B 27/0172
See application file for complete search history.

(56) References Cited

U.S. PATENT DOCUMENTS

| | | | |
|---|---|---|---|
| 10,401,627 B1 | 9/2019 | Richards et al. | |
| 10,834,344 B2 | 11/2020 | Chen et al. | |
| 10,963,998 B1 | 3/2021 | Baar et al. | |
| 11,211,030 B2 | 12/2021 | Bonnier et al. | |
| 2013/0278631 A1* | 10/2013 | Border | G06F 3/04842 345/633 |
| 2017/0090194 A1 | 3/2017 | Hayes | |

(Continued)

*Primary Examiner* — Adam R. Giesy
(74) *Attorney, Agent, or Firm* — Treyz Law Group, P.C.; Kendall P. Woodruff

(57) ABSTRACT

A head-mounted device may include a camera that captures a live video feed of an environment. A display in the head-mounted device may display passthrough display content that includes the live video feed. Control circuitry may dynamically adjust a maximum allowable brightness for the passthrough display content during operation of the head-mounted device. Upon an initial donning of the head-mounted device, the passthrough display content may be permitted to use most or all of the achievable brightness range of the display. After a given time period, the user may be adapted to the brightness range of the display and the maximum allowable brightness for the passthrough display content may be reduced to allow additional headroom for rendered display content. The control circuitry may continue to adjust tone mappings for passthrough display content and rendered display content based on whether the display content favors real-world content or virtual content.

19 Claims, 7 Drawing Sheets

(56) References Cited

U.S. PATENT DOCUMENTS

| | | |
|---|---|---|
| 2020/0169725 A1 | 5/2020 | Hua et al. |
| 2020/0310537 A1* | 10/2020 | Simmons ............ G02B 27/0172 |
| 2021/0134245 A1* | 5/2021 | Bonnier ............... G06V 40/193 |
| 2021/0302745 A1 | 9/2021 | Mutlu et al. |
| 2023/0015610 A1 | 1/2023 | Buckley et al. |

* cited by examiner

ELECTRONIC DEVICES WITH DYNAMIC BRIGHTNESS RANGES FOR PASSTHROUGH DISPLAY CONTENT

This application claims the benefit of U.S. Provisional Patent Application No. 63/433,288, filed Dec. 16, 2022, which is hereby incorporated by reference herein in its entirety.

FIELD

This relates generally to electronic devices, and, more particularly, to electronic devices such as head-mounted devices.

BACKGROUND

Electronic devices such as head-mounted devices may have cameras for capturing a video feed of an external environment and one or more displays for presenting the captured video feed to a user. Head-mounted devices may render display content on top of the real-world content in the passthrough video feed.

It can be challenging to design a head-mounted device in which the user is presented with passthrough video feed and rendered display content. If care is not taken, rendered display content may appear washed out in comparison with passthrough display content.

SUMMARY

An electronic device such as a head-mounted device may include one or more cameras for capturing a video feed of a real-world environment and one or more displays for presenting the passthrough video feed to a user. The display may also display rendered display content such as user interface elements, virtual images, high-dynamic-range media (e.g., movies, video playback, photographs, user illustrations, etc.), and/or other rendered display content. The rendered display content may be displayed on its own or may be overlaid onto real-world content in the passthrough video feed.

Control circuitry may dynamically adjust a maximum allowable brightness of the passthrough display content during operation of the head-mounted device. Upon an initial donning of the head-mounted device, the passthrough display content may be permitted to use most or all of the achievable brightness range of the display. After a given time period, the user's vision may be adapted to the viewing environment of the head-mounted device, and the control circuitry may gradually reduce the maximum allowable brightness range of the passthrough display content to allow additional headroom for rendered display content. The control circuitry may continue to adjust the maximum allowable brightness for the passthrough display content and the amount of headroom available for rendered display content based on whether the display content favors (e.g., is focused on) real-world content or virtual content.

DETAILED DESCRIPTION

Figure 1:
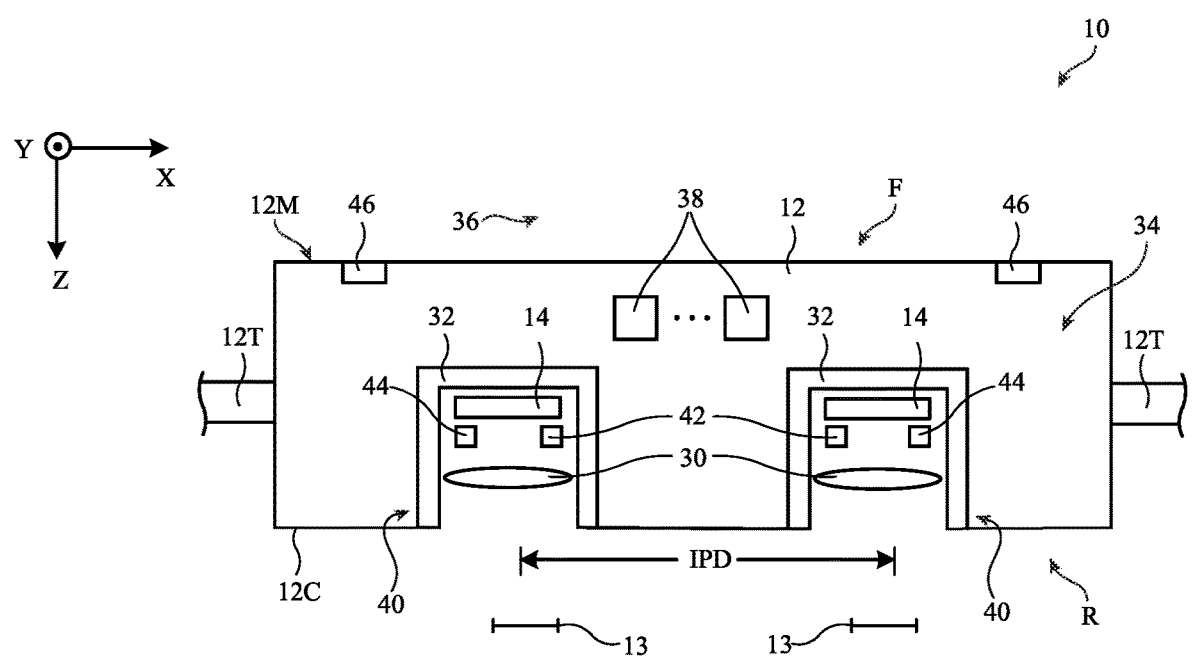
FIG. 1 is a top view of an illustrative head-mounted device in accordance with an embodiment.

An electronic device such as a head-mounted device may have a front face that faces away from a user's head and may have an opposing rear face that faces the user's head. One or more cameras on the front face of the device may be used to capture a live passthrough video stream of the external real-world environment. One or more displays on the rear face of the device may be used to present the live passthrough video stream to a user's eyes.

The head-mounted device may include control circuitry that is used to display rendered display content on the display of the head-mounted device. Rendered display content may include user interface elements (e.g., menu options, icons, text, settings, status indicators, other graphical user interface elements, etc.), high-dynamic-range media such as high-dynamic-range videos and/or images, virtual display content (e.g., computer-generated virtual images, avatars, video games, text, graphics, etc.), and/or other rendered display content.

In some scenarios, the rendered display content may be overlaid onto the real-world content of the passthrough video feed, such that both rendered display content and passthrough display content are displayed at the same time. In other scenarios, the display may only display rendered display content (without displaying any passthrough display content), or the display may only display passthrough display content (without displaying any rendered display content).

In many scenarios, the ambient light in the user's environment will exceed the maximum brightness of the display. In these scenarios, rendered display content may appear washed out in comparison with the bright real-world content in the passthrough video feed, if care is not taken. For example, if passthrough display content is permitted to use the full brightness range of the display in all use-case scenarios, there may be insufficient headroom for rendered display content such as high-dynamic-range video, user interface elements, and virtual images, causing these rendered display items to appear too dim in comparison with the bright passthrough content.

Control circuitry in the head-mounted device may therefore dynamically adjust the brightness range available for passthrough content in coordination with adjusting the amount of headroom available for rendered display content to optimize the viewing experience for the user. The control circuitry may dynamically adjust the amount of headroom available for rendered display content based on different usage scenarios, such as what type of display content is being viewed on the display and/or based on whether the user has just donned the head-mounted device (and is therefore ambient-adapted) or whether the user has been wearing the head-mounted device for some time already (and is therefore device-adapted). For example, when a user first dons the head-mounted device and is still adapted to bright ambient light, the control circuitry may use a first brightness setting that permits the passthrough display content to use most or all of the full brightness range of the display, with little to no headroom leftover for rendered display content. This allows the real world on display 14 to more closely match the real world that the user's eyes are adapted to. As the user continues to wear the head-mounted device, the user may gradually be device-adapted to the darker viewing environment, and the control circuitry may decrease the available brightness range for passthrough display content while increasing the available headroom for rendered display content. The control circuitry may continue to adjust the brightness range available for passthrough display content and the available headroom for rendered display content based on what display content is being displayed (e.g., based on what application is being used, based on whether the display content includes high-dynamic-range images, virtual images, camera-captured images, etc.).

A top view of an illustrative head-mounted device is shown in FIG. 1. As shown in FIG. 1, head-mounted devices such as electronic device 10 may have head-mounted support structures such as housing 12. Housing 12 may include portions (e.g., head-mounted support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., a head-mounted housing such as main housing portion 12M) of housing 12 may support electronic components such as displays 14.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures, and these rigid walls may optionally be covered with electrical components, fabric, leather, or other soft materials, etc. Housing portion 12M may also have internal support structures such as a frame (chassis) and/or structures that perform multiple functions such as controlling airflow and dissipating heat while providing structural support.

The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, spectacles, a hat, a mask, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have one or more cameras such as cameras 46 of FIG. 1. Cameras 46 that are mounted on front face F and that face outwardly (towards the front of device 10 and away from the user) may sometimes be referred to herein as forward-facing or front-facing cameras. Cameras 46 may capture visual odometry information, image information that is processed to locate objects in the user's field of view (e.g., so that virtual content can be registered appropriately relative to real-world objects), image content that is displayed in real time for a user of device 10, and/or other suitable image data. For example, forward-facing (front-facing) cameras may allow device 10 to monitor movement of the device 10 relative to the environment surrounding device 10 (e.g., the cameras may be used in forming a visual odometry system or part of a visual inertial odometry system). Forward-facing cameras may also be used to capture images of the environment that are displayed to a user of the device 10. If desired, images from multiple forward-facing cameras may be merged with each other and/or forward-facing camera content can be merged with computer-generated content for a user.

Device 10 may have any suitable number of cameras 46. For example, device 10 may have K cameras, where the value of K is at least one, at least two, at least four, at least six, at least eight, at least ten, at least 12, less than 20, less than 14, less than 12, less than 10, 4-10, or other suitable value. Cameras 46 may be sensitive at infrared wavelengths (e.g., cameras 46 may be infrared cameras), may be sensitive at visible wavelengths (e.g., cameras 46 may be visible cameras), and/or cameras 46 may be sensitive at other wavelengths. If desired, cameras 46 may be sensitive at both visible and infrared wavelengths.

Device 10 may have left and right optical modules 40. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14, lens 30, and support structure such as support structure 32. Support structure 32, which may sometimes be referred to as a lens support structure, optical component support structure, optical module support structure, or optical module portion, or lens barrel, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

Not all users have the same interpupillary distance IPD. To provide device 10 with the ability to adjust the interpupillary spacing between modules 40 along lateral dimension X and thereby adjust the spacing IPD between eye boxes 13 to accommodate different user interpupillary distances, device 10 may be provided with one or more actuators. The actuators can be manually controlled and/or computer-controlled actuators (e.g., computer-controlled motors) for moving support structures 32 relative to each other.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 or other light-emitting devices such as lasers, lamps, etc. Cameras 42 and light-emitting diodes 44 may operate at any suitable wavelengths (visible, infrared, and/or ultraviolet). As an example, diodes 44 may emit infrared light that is invisible (or nearly invisible) to the user. This allows eye monitoring operations to be performed continuously without interfering with the user's ability to view images on displays 14.

Figure 2:
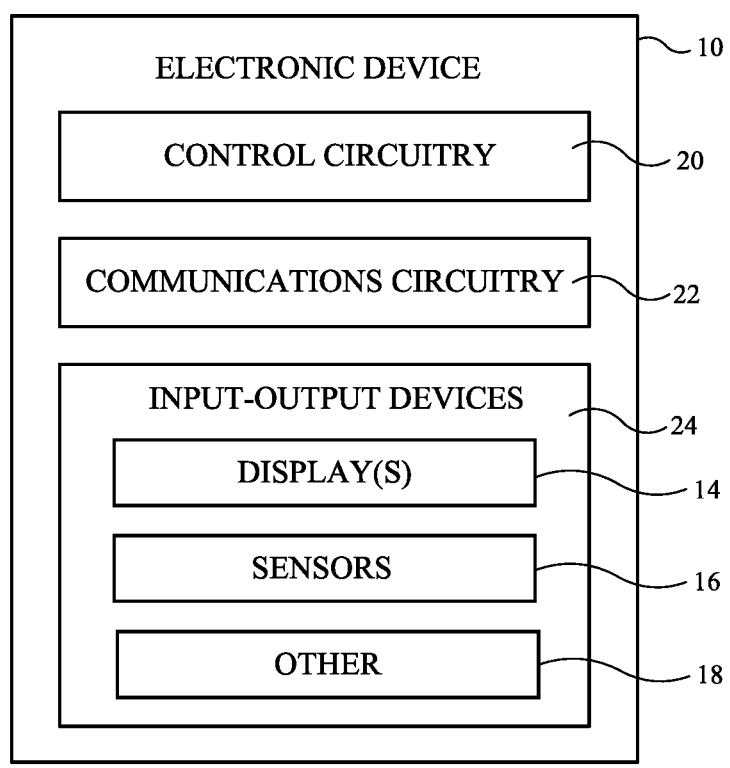
FIG. 2 is a schematic diagram of an illustrative head-mounted device in accordance with an embodiment.

A schematic diagram of an illustrative electronic device such as a head-mounted device or other wearable device is shown in FIG. 2. Device 10 of FIG. 2 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 2.

As shown in FIG. 2, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. One or more processors in control circuitry 20 may be used to gather input from sensors and other input devices and may be used to control output devices. The processing circuitry may be based on one or more processors such as microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output. Control circuitry 20 may be configured to perform operations in device 10 using hardware (e.g., dedicated hardware or circuitry), firmware, and/or software. Software code for performing operations in device 10 may be stored on storage circuitry (e.g., non-transitory (tangible) computer readable storage media that stores the software code). The software code may sometimes be referred to as program instructions, software, data, instructions, or code. The stored software code may be executed by the processing circuitry within circuitry 20.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device or a controller, computer stylus, or other input device, speakers or other output devices, etc.) over a wireless link.

For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras), fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion of device 10 and/or information about a pose of a user's head (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, three-dimensional camera systems such as depth sensors (e.g., structured light sensors and/or depth sensors based on stereo imaging devices that capture three-dimensional images) and/or optical sensors such as self-mixing sensors and light detection and ranging (lidar) sensors that gather time-of-flight measurements (e.g., time-of-flight cameras), humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Display(s) 14 can be used to present a variety of content to a user's eye. The left and right displays 14 that are used to present a fused stereoscopic image to the user's eyes when viewing through eye boxes 13 can sometimes be referred to collectively as a display 14. As an example, virtual reality (VR) content can be presented by display 14. Virtual reality content may refer to content that only includes virtual objects within a virtual reality (computer-generated) environment. As another example, mixed reality (MR) content can be presented by display 14. Mixed reality content may refer to content that includes virtual objects and real objects from the real-world physical environment in which device 10 is being operated. As another example, only real-world content can be presented by display 14. The real-world content may refer to images being captured by one or more front-facing cameras (see, e.g., cameras 46 in FIG. 1) and passed through as a live feed to the user. The real-world content being captured by the front-facing cameras is therefore sometimes referred to as a camera passthrough feed, a (live) video passthrough feed, passthrough display content, or a passthrough video feed (stream).

Display 14 may display images with a standard-dynamic-range (e.g., images that exhibit a contrast ratio of about 1,000:1 between their brightest and darkest pixel luminance values) and/or may display images with a high-dynamic-range (e.g., images that exhibit a contrast ratio of about 10,000:1 or more between their brightest and darkest luminance values).

During operation, content generators in device 10 (e.g., operating system functions and/or applications running on control circuitry 20) may generate content for display on the pixel array of display 14. As an example, electronic device 10 may include one or more standard-dynamic-range (SDR) content generators and/or more high-dynamic-range (HDR) content generators (e.g., content generators that generate high-dynamic-range content in accordance with one or more different high-dynamic-range standards such as the HDR10 Media Profile standard, sometimes referred to as HDR10 and the Hybrid Log-Gamma standard, sometimes referred to as HLG). A luminance value mapping engine such as a tone mapping engine in control circuitry 20 may be used to provide content generators with tone mapping parameters (sometimes referred to as luminance value mapping parameters) indicating how the content generators should map content luminance values to display luminance values and/or may be used to directly perform content-luminance-to-display-luminance mapping operations on content luminance values from the content generators. For example, the tone mapping engine of control circuitry 20 may supply content generators with tone mapping parameters such as a black level, reference white level, specular white level, skin tone level, and/or gamma and/or slope values to use in producing display luminance values for use in displaying images with display 14. The tone mapping engine may be implemented using code running on control circuitry 20, display driver circuitry of control circuitry 20, other circuitry in control circuitry 20 and/or may use hardwired features of control circuitry 20 in device 10.

Standard-dynamic-range content is often encoded in gray levels (e.g., 0-255 bits), where 0 corresponds to dark black and 255 corresponds to bright white. High-dynamic-range content is encoded in luminance levels for each pixel (generally to be displayed for standard viewing conditions such as dim viewing conditions). Device 10 may experience changes in ambient lighting conditions, user brightness settings may be adjusted up and down by a user, the content being displayed on display 14 may exhibit changes such as changes in average pixel luminance, and other conditions related to the presentation of content on display 10 may change over time. Device 10 may use control circuitry 20 to determine appropriate tone mappings for display content on display 14 to ensure that the display content is optimized for these potentially changing conditions and other criteria such as the characteristics of display 14.

Control circuitry 20 may use tone mapping, gain maps, look-up tables, and/or other techniques to achieve the desired brightness levels across display 14. In a tone mapping arrangement, control circuitry 20 may be used to map content luminance values to display luminance values using tone mapping curves. The tone mapping curve that is used to map a given set of content luminance values to display luminance values may be selected based on display brightness settings (e.g., a user-selected brightness level, an ambient-light-adapted brightness level, etc.), may be based on which display content is being viewed on display 14, and/or may be based on user studies, modeling, and laboratory testing that helps establish desired tone mapping schemes for device 10 under a variety of operating conditions (e.g., user brightness settings, display content, and other operating conditions). These tone mapping schemes can then be implemented by control circuitry 20.

With one illustrative configuration, control circuitry 20 can select a desired tone mapping curve based on operating conditions such as display brightness settings (e.g., user-defined brightness settings, brightness levels set by device 10 to accommodate a normal power operating mode and a low-power operating mode, etc.), ambient conditions (ambient light level and ambient light color), content statistics (e.g., information on average pixel luminance or other information on operating conditions having a potential impact on display lifetime, quality information, dynamic range information etc.), and display characteristics (e.g., display limitations such as maximum achievable pixel luminance, power constraints such as those due to thermal limitations and/or other considerations), whether device 10 is operating on DC power or AC power, etc.

During operation, control circuitry 20 may obtain information on these operating conditions and may take suitable action to ensure that display 14 displays images satisfactorily. Control circuitry 20 may, as an example, remap content so that luminance values that are too high when output from a content generator are reduced by control circuitry 20 before these values are used by display 14. In some situations, luminance values associated with specular highlights of high-dynamic-range image content may be reduced to avoid making the white of standard-dynamic-range image content that is being displayed at the same time as the high-dynamic-range image content appear too dark. Control circuitry 20 may also provide content generators with tone mapping parameters that inform the content generators of a desired content-luminance-to-display-luminance mapping curve to be used in displaying images on display 14.

If desired, control circuitry 20 may use tone mapping parameters to define content-luminance-to-display-luminance mapping curves. In some configurations, tone mapping parameters may include a black level, a reference white level, and specular white level. If desired, tone mapping parameters may include a target brightness level for standard-dynamic-range image content such as passthrough display content. During operation, control circuitry 20 may supply content generators with suitable values of these tone mapping parameters, thereby informing the content generators of the appropriate tone mapping curve to use. In this way, a set of tone mapping parameters (e.g., three or more tone-mapping parameters, 3-10 tone-mapping parameters, fewer than 5 tone-mapping parameters, etc.) can be used by control circuitry 20 to specify a desired tone mapping relationship for the content generator to follow depending on current operating conditions. If control circuitry 20 uses a target brightness setting as a tone mapping parameter, control circuitry 20 may apply a tone mapping to passthrough display content based on the target brightness setting. The target brightness setting may be a luminance value (e.g., 20 nits, 32 nits, 54 nits, 92 nits, 108 nits, etc.), a percentage value (e.g., 30% of the maximum achievable brightness for display 14, 50% of the maximum achievable brightness for display 14, 85% of the maximum achievable brightness for display 14, etc.), and/or other suitable value.

Brightness settings information may include a user-selected brightness level and may include a brightness level determined by control circuitry 20 based on power consumption considerations. User brightness settings may be adjusted based on user input (e.g., touch input, button input, dial input, gesture input, finger input, gaze input, and/or any other suitable user input). Power-consumption-based brightness level adjustments may be made by control circuitry 20 to help extend battery life. For example, control circuitry 20 may lower the brightness level for display 14 when device 10 enters a low power mode due to thermal conditions such as in response to detection that a temperature level measured with a sensor has exceeded a predetermined level, due to detection of a low battery level measured with control circuitry 20, based on detection that a user has placed device 10 in a low power mode to extend battery life, etc. In low power mode, control circuitry 20 may lower the current display brightness setting, may impose a cap on the brightness level, and/or may reduce the luminance of specular highlights or may make other adjustments that help reduce the power consumption of display.

Content statistics may be gathered by analyzing frames of image data produced by content generator(s) that are being displayed on display 14 or may be provided in the form of metadata (e.g., content category information such as, for example, "movie" or "live sports"). Control circuitry 20 (e.g., a microprocessor, display driver integrated circuits, graphics processing unit circuitry, and/or other control circuitry in device 10) may, for example, maintain running averages of image luminance values (e.g., a running average pixel luminance value for images being displayed on display 14 over multiple image frames) and/or may maintain historical luminance information in a more granular fashion (e.g., on blocks of one or more pixels) to quantify risks for each of these blocks (e.g., risk of washing out standard-dynamic-range image content, etc.). Other content statistics such as information on content quality such as bit depth, dynamic range of image input data (e.g., minimum, mean, and maximum value), compression type and amount, data rate, noise level, metadata-specified quality factors, and other content quality metrics can also be gathered and provided to control circuitry 20 for tone mapping purposes.

Display characteristics may also be used by control circuitry 20 to determine tone mapping parameters. Display characteristics may include information on physical display limitations for display 14. For example, display characteristics may include information on display 14 such as maximum achievable specular white level, display resolution, contrast ratio, bit depth, etc. These display characteristics may be stored in control circuitry 20 during manufacturing (e.g., when display 14 is built into device 10) and/or may be obtained from display 14 when display 14 is coupled to device 10 (e.g., when display 14 is a stand-alone display). A user may also supply control circuitry 20 with display characteristics information (e.g., by entering this information using a touch sensor or other input-output device). In some configurations, display characteristics may be set by default and/or retrieved from a database of display characteristics maintained in device 10 (e.g., a database of stand-alone display models).

During operation, control circuitry 20 may produce content to be displayed on display 14. Control circuitry 20 may, for example, render game images in a video game, may retrieve stored movie data and provide corresponding video frames to be displayed on display 14, may display user interface elements, may produce still image frames associated with an operating system function or application program, and/or may produce other content for displaying on display 14. The content from control circuitry 20 may include standard-dynamic-range content such as live passthrough video content captured by cameras 46 and/or high-dynamic-range content such as rendered high-dynamic-range images, creative content such as illustrations, and/or other high-dynamic-range image content.

Control circuitry 20 may use information on ambient conditions, donning/doffing status (e.g., whether the user has just donned device 10 or has been wearing device 10 for a predetermined amount of time), brightness settings information, content statistics, and/or display characteristics to determine how original content values should be mapped to display content values (e.g., to determine how to map content luminance values to display luminance values in accordance with mapping curves). To ensure that content is displayed appropriately on display 14, control circuitry 20 can provide content generators with tone mapping parameters to use in performing luminance mapping operations and/or can implement luminance mapping for content generators. For example, control circuitry 20 may use tone mapping parameters such as a target brightness setting to remap luminance values associated with the passthrough display content to be displayed on display 14.

When passthrough display content and rendered display content are displayed simultaneously, tone mapping parameters such as a target brightness setting, a black level, a reference white level, and a specular white level for each of these areas can be independently adjusted to ensure that the content on display 14 is presented satisfactorily (e.g., to avoid situations in which some of the content appears too dark or too bright compared to other content, to avoid situations in which white standard definition text appears grayish rather than white when adjacent to content with bright specular highlights, etc.). For example, control circuitry 20 can detect when mixed passthrough display content and rendered display content is being presented (or is about to be presented) on display 14 and can generate corresponding tone mapping parameters that balance the appearances of the passthrough display content and rendered display content to avoid undesired visual effects while taking into account factors such as the user's brightness adaptation state, display content, user brightness settings, and/or display characteristics.

Transitions between different tone mappings can be performed smoothly by dynamically adjusting tone mapping parameter values while transitioning. For example, if rendered display content with a high specular white level is being replaced by passthrough display content with a low specular white level, the specular white level can be transitioned between the high and low levels over a suitable transition period (e.g., 0.5-20 s, 0.5-50 s, 0-50 s, 1-100 s, more than 3 s, less than 20 s, or other suitable transition period) to avoid an overly abrupt transition. If desired, different transition times may be assigned to different types of transitions (e.g., a tone mapping transition resulting from a change in the user's brightness adaptation state may be assigned a longer transition time than a tone mapping transition resulting from a change in the application that the user has selected to use on device 10).

Figure 3:
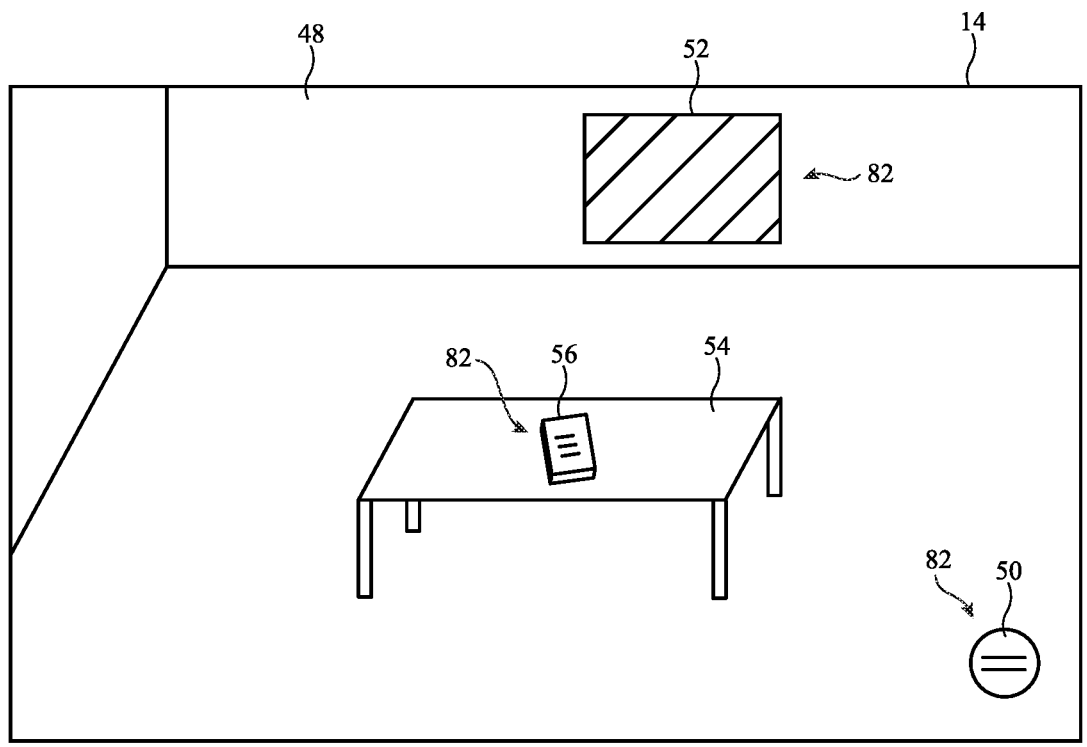
FIG. 3 is an illustrative image that may be displayed by a display in a head-mounted device and that includes passthrough display content and rendered display content in accordance with an embodiment.

FIG. 3 is a diagram of an illustrative image that may be displayed on display 14 during operation of head-mounted device 10. Control circuitry 20 may use display 14 to display passthrough display content such as passthrough display content 48. Passthrough display content 48 may include captured images (e.g., a live video feed) of the user's environment that is captured by one or more front-facing cameras such as cameras 46. Passthrough display content 48 may be displayed in many different usage scenarios, such as an onboarding (donning) usage scenario in which the user places device 10 on his or her head and begins watching display content on display 14. Passthrough display content 48 may include real-world objects such as real-world object 54 (e.g., a table in the user's environment).

In some scenarios, display 14 may only present passthrough display content 48 to a user without presenting any rendered display content. In other scenarios, control circuitry 20 may display only rendered content (without any passthrough content 48) or may overlay rendered display content onto passthrough display content 48. As shown in the example of FIG. 3, control circuitry 20 may use display 14 to display rendered display content such as rendered display content 82. Rendered display content 82 may include user interface elements such as user interface element 50, virtual images such as virtual image 56, media such as media 52, and/or other rendered display content.

User interface elements such as user interface element 50 may include text, pop-up elements, symbols, graphics, icons, moving images, information, avatars, emojis, menu options, status indicators, settings, and/or other graphical user interface elements that the user can interact with to control display 14, to control device 10, to provide other user input and/or to receive information from device 10. Media such as media 52 may include high-dynamic-range and/or standard-dynamic-range images or videos (e.g., video playback, captured images, movies, photographs, creative content such as drawing applications, painting applications, photo-editing applications, etc., and/or other media). Virtual images such as virtual image 56 may include computer-generated images that appear to be part of the user's real-world environment (e.g., that appear to be a natural part of the real-world being presented with passthrough display content 48) or may include computer-generated images that appear to be part of a virtual world being rendered on display 14. In the example of FIG. 3, virtual image 56 includes a book that appears to be resting on a real-world object such as real-world object 54 (e.g., a table in the user's environment).

If the difference between the white level (e.g., the peak brightness value) of passthrough display content 48 and the white level (e.g., the peak brightness value) of rendered display content 82 is too low (e.g., if the headroom for rendered display content 82 is too low), rendered display content 82 may appear washed out and gray. The contrast between the two white levels may be more or less noticeable depending upon where the user's eyes are focused, what application is being used on device 10, what the user's adaptation state is, etc.

Control circuitry 20 may adaptively adjust the available brightness range for passthrough display content 48 and rendered display content 82 based on various factors such as the user's brightness adaptation state (e.g., whether or not the user has just started wearing device 10 and is thus still ambient-adapted to relatively bright ambient light, or whether the user has been wearing device 10 for a given period of time and is thus device-adapted to the viewing conditions of device 10). If passthrough display content 48 is being displayed when a user initially dons device 10, control circuitry 20 may assume that the user is still ambient-adapted to the bright ambient light and may therefore allow passthrough display content 48 to use most or all of the full brightness range of display 14 so that passthrough display content 48 appears as close as possible to the real-world environment to which the user's eyes are initially adapted. Control circuitry 20 may select a tone mapping so that passthrough display content 14 is displayed satisfactorily on display 14. As an example, passthrough display content 48 may be displayed with a maximum luminance (specular white level, peak brightness value, etc.) that is close to or equal to the maximum possible pixel luminance supported by the hardware of display 14. This may sometimes be referred to as a reality-first onboarding display mode because it allows passthrough display content 48 to remain faithful to the real-world environment so that the user experiences a smooth transition from directly perceiving the real world with the user's eyes (before wearing device 10) to perceiving the real world on passthrough display content 48 of display 14 (after donning device 10).

After the user has been wearing device 10 for a given amount of time (e.g., a predetermined amount of time based on how long it typically takes for human vision to become dark-adapted or device-adapted, or an amount of time that is determined by control circuitry 20 based on sensor data, gaze information, etc.), control circuitry 20 may gradually reduce the available brightness range for passthrough display content 48 to allow for an extended dynamic range (e.g., additional headroom) for other display content such as rendered display content 82. To give the appearance of an extended dynamic range (e.g., to ensure that rendered display content 82 is sufficiently bright for a viewer), a tone mapping may be selected that allows the brightest pixels (e.g., white image content) in rendered display content 82 to be displayed with elevated luminance levels relative to the brightest pixels (e.g., white image content) in passthrough display content 48. In other words, the brightest white used for rendered display content 82 (e.g., the specular highlights in a high-dynamic-range photograph) may be higher than the brightness white used for passthrough display content 48 (e.g., the white walls of a room that a user is located in).

Control circuitry 20 may continue to dynamically adjust the available brightness ranges for passthrough display content 48 and rendered display content 82 during operation of device 10 based on what display content is being displayed, based on which application is running on device 10, based on user settings, based on sensor data, based on where the user is gazing, and/or based on other information. When a user is using an application or viewing display content that favors reality and/or the real-world environment (e.g., a room scanning application where a user is capturing images or video of the user's environment), control circuitry 20 may allow a greater brightness range for passthrough display content 48 so that the brightness of passthrough display content 48 can remain as faithful as possible to the real-world brightness. When a user is using an application or viewing display content that favors virtual display content and/or other rendered display content (e.g., high-dynamic-range video playback, video games, creative applications such as painting applications, drawing applications, illustrating applications, etc.), control circuitry 20 may reduce the brightness range available for passthrough display content 48 and increase the available headroom for rendered display content 82 so that rendered display content 82 can have a rich appearance that stands out or pops relative to passthrough display content 48.

FIGS. 4, 5, 6, 7, and 8 are graphs showing illustrative tone mapping parameters such as target brightness settings for display 14 in different usage scenarios. Control circuitry 20 may select between the different tone mapping parameters based on operating conditions such as display content, donning/doffing status (e.g., whether the user has been wearing device 10 for a given amount of time), user brightness settings, and/or other operating conditions.

Figure 4:
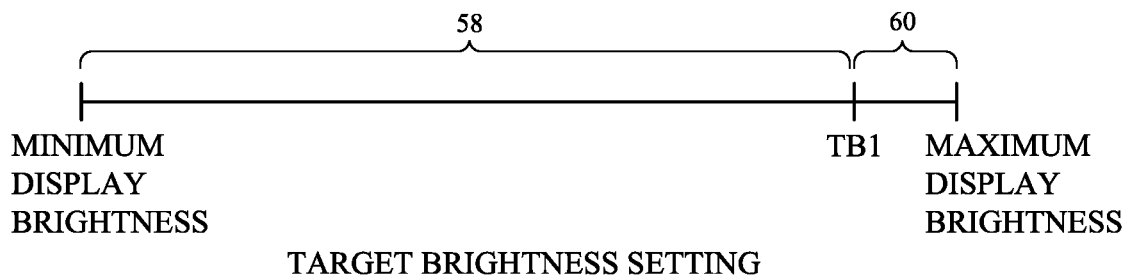
FIG. 4 is a diagram showing an illustrative target brightness setting for a first display mode such as a reality-first, onboarding display mode in which passthrough display content is permitted to use most or all of the full brightness range of the display in accordance with an embodiment.

In the example of FIG. 4, control circuitry 20 has selected a first tone mapping parameter such as target brightness setting TB1 for display 14. In this target brightness setting, passthrough display content 48 is permitted to use brightness range 58 which ranges from the minimum display brightness to brightness value TB1. Brightness value TB1 may be less than or equal to the maximum brightness that is achievable with the hardware of display 14. In the example of FIG. 4, brightness value TB1 is slightly less than the maximum display brightness (e.g., TB1 may be equal to 85% of the maximum display brightness, 90% of the maximum display brightness, 75% of the maximum display brightness, more than 75% of the maximum display brightness, less than 75% of the maximum display brightness, etc.). By making brightness range 58 available for passthrough display content 48 slightly less than the full brightness of display 14, additional headroom such as headroom 60 may be provided for rendered display content 82. This allows rendered display content 82 such as user interface elements 50, virtual elements 56, media 52, and/or other rendered display content to have brighter whites than the whites of passthrough display content 48.

The tone mapping parameters of FIG. 4 may be used by control circuitry 20 in certain display modes such as when the user initially dons device 10 and is still ambient-adapted to bright ambient light. This display mode may sometimes be referred to as a reality-first, onboarding display mode because it ensures that the content on display 14 more closely matches the appearance of the real-world environment to which the user is adapted when the user starts wearing device 10. By reserving headroom 60 for rendered display content 82, user interface elements such as user interface element 50 may stand out or pop relative to passthrough display content 48 while still preserving the appearance of the real-world environment that is presented with passthrough display content 48.

In some scenarios, control circuitry 20 may apply a first tone mapping to passthrough display content 48 based on target brightness value TB1 and may apply one or more second tone mappings to rendered display content 82 based on target brightness value TB1. Following each tone mapping, control circuitry 20 may combine the mapped passthrough display content 48 and mapped rendered display content 82 to form a combined image that is displayed on display 14. In other scenarios, control circuitry 20 may first combine passthrough display content 48 and rendered display content 82 to form a combined image that is then tone mapped based on target brightness value TB1 and displayed on display 14.

Control circuitry 20 may assign a transition time with which a previous tone mapping may transition to the tone mapping of FIG. 4. The transition time may be determined based on what triggered the tone mapping change (e.g., smaller transition times may be assigned for user-initiated changes in display content where the user is expecting an abrupt change in display appearance, whereas longer transition times be assigned for tone mapping changes that the user is not expected to notice such as tone mapping changes associated with a user's transition from an ambient-adapted state to a device-adapted state). In the example of FIG. 4, target brightness setting TB1 may be used upon donning and/or powering on device 10 and may not need a transition time (e.g., target brightness setting TB1 may be the initial brightness setting for device 10 upon donning or turning on device 10).

Figure 5:
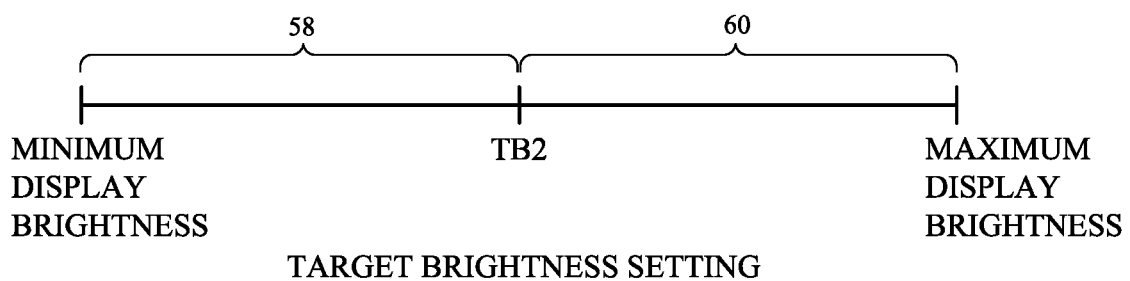
FIG. 5 is a diagram showing an illustrative target brightness setting for a second display mode such as a reality-first, device-adapted display mode in which passthrough display content is only permitted to use a portion of the full brightness range of the display so that additional headroom may be provided for rendered display content in accordance with an embodiment.

In the example of FIG. 5, control circuitry 20 has selected a second tone mapping parameter such as target brightness setting TB2 for display 14. In this target brightness setting, passthrough display content 48 is only permitted to use brightness range 58 which ranges from the minimum display brightness to brightness value TB2. Brightness value TB2 may be less than the maximum brightness that is achievable with the hardware of display 14. In the example of FIG. 5, brightness value TB2 is about half of the maximum display brightness (e.g., TB2 may be equal to 50% of the maximum display brightness, 45% of the maximum display brightness, 55% of the maximum display brightness, more than 50% of the maximum display brightness, less than 50% of the maximum display brightness, etc.). By making brightness range 58 available for passthrough display content 48 less than the full brightness of display 14, additional headroom such as headroom 60 may be provided for rendered display content 82. This allows rendered display content 82 such as user interface elements 50, virtual elements 56, media 52, and/or other rendered display content to have brighter whites than the whites of passthrough display content 48.

The tone mapping parameters of FIG. 5 may be used by control circuitry 20 in certain display modes such as when the user has been wearing device 10 for a given period of time (and is therefore device-adapted to the brightness range of device 10) but is still viewing real-world objects in passthrough display content 48. This display mode may sometimes be referred to as a reality-first, device-adapted display mode because it ensures that passthrough content 48 on display 14 appears to match the appearance of the real-world environment while taking advantage of the fact that the user is now device-adapted (e.g., dark-adapted) and is therefore more sensitive to lower brightness levels. By reserving headroom 60 for rendered display content 82, user interface elements 50, virtual images 56, media 52, and/or other rendered display content 82 may stand out or pop relative to passthrough display content 48 while still preserving the appearance of the real-world environment that is presented with passthrough display content 48.

In some scenarios, control circuitry 20 may apply a first tone mapping to passthrough display content 48 based on target brightness value TB2 and may apply one or more second tone mappings to rendered display content 82 based on target brightness value TB2. Following each tone mapping, control circuitry 20 may combine the mapped passthrough display content 48 and mapped rendered display content 82 to form a combined image that is displayed on display 14. In other scenarios, control circuitry 20 may first combine passthrough display content 48 and rendered display content 82 to form a combined image that is then tone mapped based on target brightness value TB2 and displayed on display 14.

Control circuitry 20 may assign a transition time with which a previous tone mapping may transition to the tone mapping of FIG. 5. The transition time may be determined based on what triggered the tone mapping change (e.g., smaller transition times may be assigned for user-initiated changes in display content where the user is expecting an abrupt change in display appearance, whereas longer transition times be assigned for tone mapping changes that the user is not expected to notice such as tone mapping changes associated with a user's transition from an ambient-adapted state to a device-adapted state). In the example of FIG. 5, control circuitry may assign a non-zero transition time for transitioning from a previous tone mapping parameter such as target brightness setting TB1 of FIG. 4 to target brightness setting TB2 of FIG. 5. The transition time may, for example, be a predetermined amount of time based on how long it typically takes for a user to become adapted to the brightness range of device 10. If desired, a different transition time may be assigned if control circuitry 20 is transitioning to target brightness setting TB2 of FIG. 5 from a different brightness setting other than that of FIG. 4.

Figure 6:
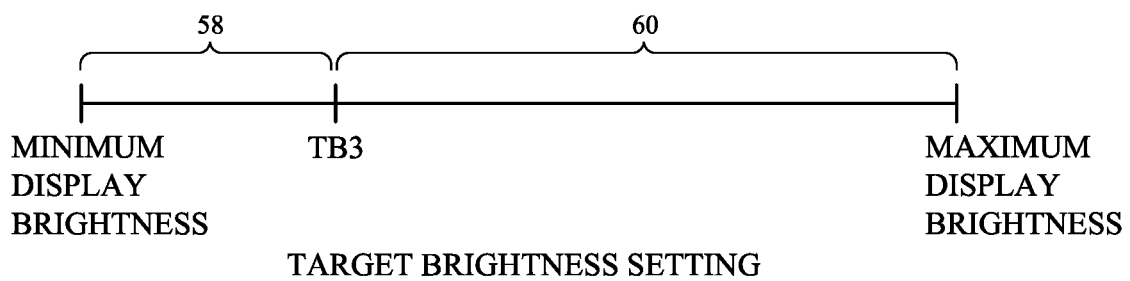
FIG. 6 is a diagram showing an illustrative target brightness setting for a third display mode such as a media-first display mode in which most of the brightness range of the display is reserved as headroom for rendered display content such as high-dynamic-range display content while passthrough display content is only permitted to use a portion of the full brightness range of the display in accordance with an embodiment.

In the example of FIG. 6, control circuitry 20 has selected a third tone mapping parameter such as target brightness setting TB3 for display 14. In this target brightness setting, passthrough display content 48 is only permitted to use brightness range 58 which ranges from the minimum display brightness to brightness value TB3. Brightness value TB3 may be less than the maximum brightness that is achievable with the hardware of display 14. In the example of FIG. 6, brightness value TB3 is less than half of the maximum display brightness (e.g., TB3 may be equal to 30% of the maximum display brightness, 35% of the maximum display brightness, 25% of the maximum display brightness, more than 30% of the maximum display brightness, less than 30% of the maximum display brightness, etc.). By making brightness range 58 available for passthrough display content 48 less than the full brightness of display 14, additional headroom such as headroom 60 may be provided for rendered display content 82. This allows rendered display content 82 such as user interface elements 50, virtual elements 56, media 52, and/or other rendered display content 82 to have brighter whites than the whites of passthrough display content 48.

The tone mapping parameters of FIG. 6 may be used by control circuitry 20 in certain display modes such as when the user has been wearing device 10 for a given period of time (and is therefore device-adapted to the brightness range of display 14) and has launched a media or creative application that focuses on rendered display content 82 such as high-dynamic range video playback, creative content such as painting, drawing, illustrating, photo-editing, or other applications, and/or virtual content. This display mode may sometimes be referred to as a media-first display mode because it ensures that rendered display content 82 such as media 52 on display 14 appears rich and sufficiently bright to the user without needing to preserve the appearance of the real-world environment in passthrough display content 48. By reserving headroom 60 for rendered display content 82, user interface elements 50, virtual images 56, media 52, and/or other rendered display content 82 may stand out or pop relative to passthrough display content 48 while the reduced brightness of the real-world environment in passthrough display content 48 may not be as noticeable to the user.

In some scenarios, control circuitry 20 may apply a first tone mapping to passthrough display content 48 based on target brightness value TB3 and may apply one or more second tone mappings to rendered display content 82 based on target brightness value TB3. Following each tone mapping, control circuitry 20 may combine the mapped passthrough display content 48 and mapped rendered display content 82 to form a combined image that is displayed on display 14. In other scenarios, control circuitry 20 may first combine passthrough display content 48 and rendered display content 82 to form a combined image that is then tone mapped based on target brightness value TB3 and displayed on display 14.

Control circuitry 20 may assign a transition time with which a previous tone mapping may transition to the tone mapping of FIG. 6. The transition time may be determined based on what triggered the tone mapping change (e.g., smaller transition times may be assigned for user-initiated changes in display content where the user is expecting an abrupt change in display appearance, whereas longer transition times be assigned for tone mapping changes that the user is not expected to notice such as tone mapping changes associated with a user's transition from an ambient-adapted state to a device-adapted state). In the example of FIG. 6, control circuitry 20 may assign a transition time for transitioning from a previous tone mapping parameter such as target brightness setting TB2 of FIG. 5 to target brightness setting TB3 of FIG. 6. If the transition from target brightness setting TB2 of FIG. 5 to target brightness setting TB3 of FIG. 6 is a result of a user launching a media application on device 10, the user is likely expecting an abrupt change in appearance of display 14 and little to no transition time may be needed. If desired, a different transition time may be assigned if control circuitry 20 is transitioning to target brightness setting TB3 of FIG. 6 from a different brightness setting other than that of FIG. 5.

Figure 7:
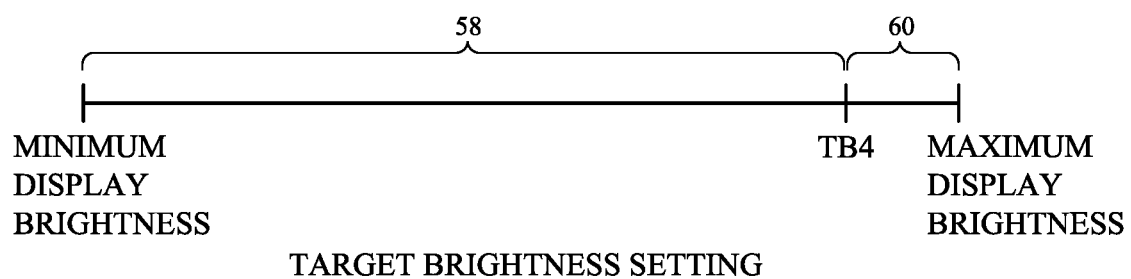
FIG. 7 is a diagram showing an illustrative target brightness setting for a fourth display mode such as a passthrough-first display mode in which passthrough display content is permitted to use most or all of the brightness range of the display in accordance with an embodiment.

In the example of FIG. 7, control circuitry 20 has selected a fourth tone mapping parameter such as target brightness setting TB4 for display 14. In this target brightness setting, passthrough display content 48 is only permitted to use brightness range 58 which ranges from the minimum display brightness to brightness value TB4. Brightness value TB4 may be less than or equal to the maximum brightness that is achievable with the hardware of display 14. In the example of FIG. 7, brightness value TB4 is more than half of the maximum display brightness (e.g., TB4 may be equal to 85% of the maximum display brightness, 75% of the maximum display brightness, 90% of the maximum display brightness, more than 80% of the maximum display brightness, less than 80% of the maximum display brightness, etc.). By making brightness range 58 available for passthrough display content 48 less than the full brightness of display 14, additional headroom such as headroom 60 may be provided for rendered display content 82. This allows rendered display content 82 such as user interface elements 50, virtual elements 56, media 52, and/or other rendered display content 82 to have brighter whites than the whites of passthrough display content 48, if desired.

The tone mapping parameters of FIG. 7 may be used by control circuitry 20 in certain display modes such as when the user has been wearing device 10 for a given period of time (and is therefore device-adapted to the brightness range of display 14) and is focusing on passthrough display content 48. This display mode may sometimes be referred to as a passthrough-first display mode because it ensures that passthrough display content 48 remains faithful to the real-world environment on which the user is focused. By reserving a minimal amount of headroom 60 for rendered display content 82, user interface elements 50 such as camera control user interface elements (e.g., for cameras 46), menu options, settings, and/or other information or selectable options may remain prominent on display 14.

In some scenarios, control circuitry 20 may apply a first tone mapping to passthrough display content 48 based on target brightness value TB4 and may apply one or more second tone mappings to rendered display content 82 based on target brightness value TB4. Following each tone mapping, control circuitry 20 may combine the mapped passthrough display content 48 and mapped rendered display content 82 to form a combined image that is displayed on display 14. In other scenarios, control circuitry 20 may first combine passthrough display content 48 and rendered display content 82 to form a combined image that is then tone mapped based on target brightness value TB4 and displayed on display 14.

Control circuitry 20 may assign a transition time with which a previous tone mapping may transition to the tone mapping of FIG. 7. The transition time may be determined based on what triggered the tone mapping change (e.g., smaller transition times may be assigned for user-initiated changes in display content where the user is expecting an abrupt change in display appearance, whereas longer transition times be assigned for tone mapping changes that the user is not expected to notice such as tone mapping changes associated with a user's transition from an ambient-adapted state to a device-adapted state). In the example of FIG. 7, control circuitry 20 may assign a transition time for transitioning from a previous tone mapping parameter such as target brightness setting TB3 of FIG. 6 to target brightness setting TB4 of FIG. 7. If the transition from target brightness setting TB3 of FIG. 6 to target brightness setting TB4 of FIG. 7 is a result of a user initiating a camera capture application (e.g., a room scanning application or other application that involves a faithful representation of the real-world environment) on device 10, the user is likely expecting an abrupt change in appearance of display 14 and little to no transition time may be needed. If desired, a different transition time may be assigned if control circuitry 20 is transitioning to target brightness setting TB4 of FIG. 7 from a different brightness setting other than that of FIG. 6.

Figure 8:
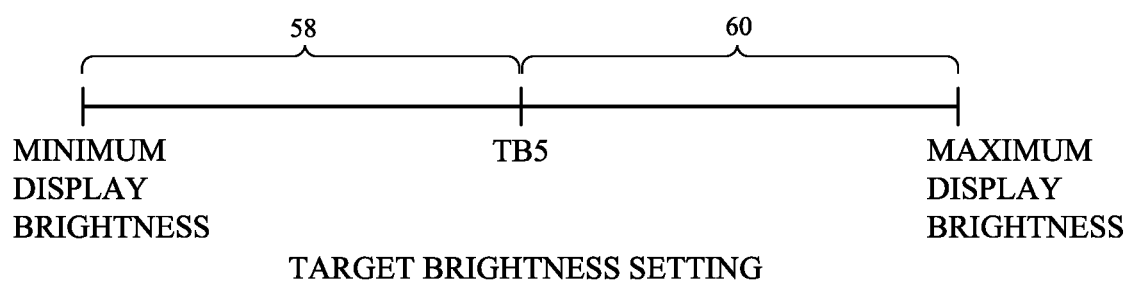
FIG. 8 is a diagram showing an illustrative target brightness setting for a fifth display mode such as a virtual-reality-first display mode in which passthrough display content is only permitted to use a portion of the full brightness range of the display so that additional headroom may be provided for rendered display content such as virtual reality display content in accordance with an embodiment.

In the example of FIG. 8, control circuitry 20 has selected a fifth tone mapping parameter such as target brightness setting TB5 for display 14. In this target brightness setting, passthrough display content 48 is only permitted to use brightness range 58 which ranges from the minimum display brightness to brightness value TB5. Brightness value TB5 may be less than the maximum brightness that is achievable with the hardware of display 14. In the example of FIG. 8, brightness value TB5 is about half of the maximum display brightness (e.g., TB5 may be equal to 50% of the maximum display brightness, 60% of the maximum display brightness, 40% of the maximum display brightness, more than 50% of the maximum display brightness, less than 50% of the maximum display brightness, etc.). By making brightness range 58 available for passthrough display content 48 less than the full brightness of display 14, additional headroom such as headroom 60 may be provided for rendered display content 82. This allows rendered display content 82 such as user interface elements 50, virtual elements 56, media 52, and/or other rendered display content to have brighter whites than the whites of passthrough display content 48, if desired.

The tone mapping parameters of FIG. 8 may be used by control circuitry 20 in certain display modes such as when the user has been wearing device 10 for a given period of time (and is therefore device-adapted to the brightness range of display 14) and is focusing on virtual content such as virtual content 56. This display mode may sometimes be referred to as a virtual-reality-first display mode because it ensures that virtual content 56 on which the user is focused appears rich and sufficiently bright even in the presence of passthrough display content 48. Because the user is less focused on passthrough display content 48 (and is also dark-adapted to the viewing environment of device 10), the user is unlikely to notice the reduced brightness of passthrough display content 48.

In some scenarios, control circuitry 20 may apply a first tone mapping to passthrough display content 48 based on target brightness value TB5 and may apply one or more second tone mappings to rendered display content 82 based on target brightness value TB5. Following each tone mapping, control circuitry 20 may combine the mapped passthrough display content 48 and mapped rendered display content 82 to form a combined image that is displayed on display 14. In other scenarios, control circuitry 20 may first combine passthrough display content 48 and rendered display content 82 to form a combined image that is then tone mapped based on target brightness value TB5 and displayed on display 14.

Control circuitry 20 may assign a transition time with which a previous tone mapping may transition to the tone mapping of FIG. 8. The transition time may be determined based on what triggered the tone mapping change (e.g., smaller transition times may be assigned for user-initiated changes in display content where the user is expecting an abrupt change in display appearance, whereas longer transition times be assigned for tone mapping changes that the user is not expected to notice such as tone mapping changes associated with a user's transition from an ambient-adapted state to a device-adapted state). In the example of FIG. 8, control circuitry 20 may assign a transition time for transitioning from a previous tone mapping parameter such as target brightness setting TB4 of FIG. 7 to target brightness setting TB5 of FIG. 8. If the transition from target brightness setting TB4 of FIG. 7 to target brightness setting TB5 of FIG. 8 is a result of a user initiating a virtual reality application (e.g., a virtual reality video game or other application that involves virtual images 56) on device 10, the user is likely expecting an abrupt change in appearance of display 14 and little to no transition time may be needed. If desired, a different transition time may be assigned if control circuitry 20 is transitioning to target brightness setting TB5 of FIG. 8 from a different brightness setting other than that of FIG. 7.

Figure 9:
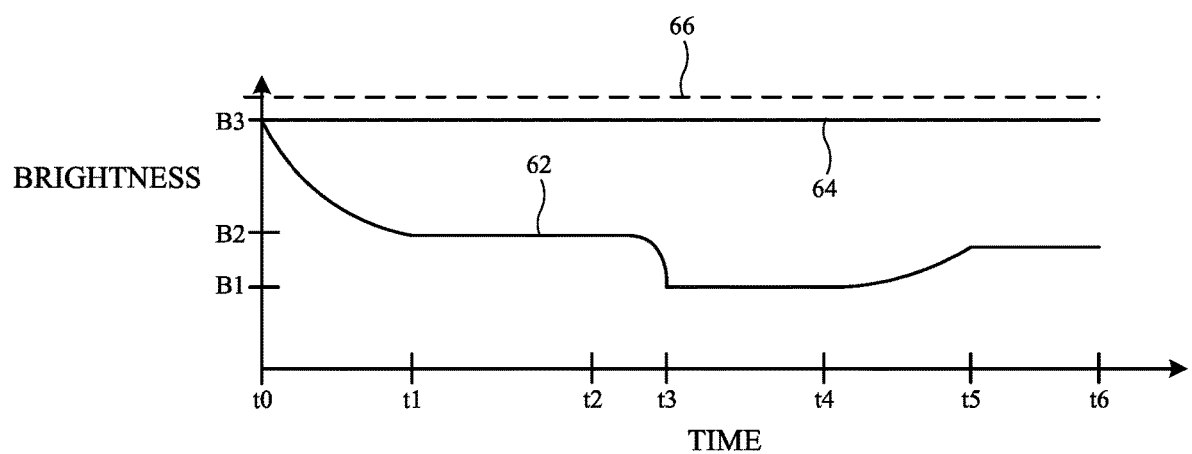
FIG. 9 is a graph showing an illustrative example of how a target brightness setting of a display in a head-mounted device may change over time during operation of the head-mounted device in accordance with an embodiment.

FIG. 9 is a graph showing an illustrative example of how control circuitry 20 may adjust tone mapping parameters such as a target brightness setting for display 14 over time during operation of device 10. Other target brightness settings may be used for other operating changes depending on how device 10 is being used. The example of FIG. 9 is merely illustrative.

Curve 66 of FIG. 9 represents an ambient brightness level of the user's environment. Curve 64 of FIG. 9 represents the maximum brightness that is achievable with the hardware of display 14. Curve 62 represents the target brightness setting for display 14 (e.g., the maximum allowable brightness for passthrough display content 48). As shown in FIG. 9, ambient brightness (curve 66) may typically be higher than the maximum achievable brightness of display 14 (curve 64). Control circuitry 20 may dynamically adjust the maximum allowable brightness (e.g., the brightest white) for passthrough display content 48 (curve 62), and thus the available headroom for rendered display content 82, during operation of device 10 based on various factors such as display mode, display content, what application is running on device 10, user brightness settings, user preferences, ambient light information, power levels, donning/doffing status (e.g., how long the user has been wearing device 10, how long device 10 has been powered on, etc.), sensor information such as user gaze location, eye fatigue information, and/or other sensor information, and/or based on other factors.

At time t0, a user initially dons device 10 (e.g., places device 10 on his or her head) in a bright room. Upon turning on and/or donning device 10, display 14 may begin displaying passthrough display content 48. As the user's vision is still ambient-adapted to the bright light in the room (e.g., curve 66), control circuitry 20 may operate display 14 in a reality-first, onboarding mode associated with a first set of tone mapping parameters such as target brightness TB1 of FIG. 4. In this setting, the maximum allowable brightness of passthrough display content 48 may be equal to brightness value B3, which is equal (or nearly equal) to the maximum allowable brightness of display 14 (curve 64). Brightness value B3 may, for example, be equal to target brightness TB1 of FIG. 4. Arrangements in which the maximum allowable brightness for passthrough display content 48 (curve 62) at time t0 is less than the maximum achievable brightness of display 14 (curve 64) may also be used (e.g., to allow user rendered user interface elements 50 to remain prominent even as passthrough display content 48 is closely matched to the brightness of the real-world environment to which the user is adapted upon donning device 10).

Between time t0 and time t1, the user's vision may gradually shift from being ambient-adapted (e.g., adapted to the brightness of the ambient light) to being device-adapted (e.g., adapted to the brightness range of display 14). Control circuitry 20 may therefore gradually reduce the maximum allowable brightness available for passthrough display content 48 from brightness value B3 to brightness value B2 over the time period between t0 and t1. At time t1, the user's vision is fully device-adapted but the user is still viewing passthrough display content 48, so control circuitry 20 may operate display 14 in a reality-first, device-adapted mode associated with a second set of tone mapping parameters such as target brightness TB2 of FIG. 5. In this setting, the maximum allowable brightness of passthrough display content 48 may be set to brightness value B2, which is less than (e.g., about half of) the maximum allowable brightness B3 of display 14 (curve 64). Brightness value B2 may, for example, be equal to target brightness TB2 of FIG. 5. This allows passthrough display content 48 to remain faithful to the real-world environment while allowing additional headroom for rendered display content 82.

From time t1 to time 2, the user continues watching mostly passthrough display content 48 with little to no rendered display content 82, so no changes are needed to the tone mapping parameters of display 14.

At time t2, the user may launch an application such as a media application (e.g., a video playback application, a photo-editing application, a creative application for drawing, painting, illustrating, etc.), a virtual reality application, and/or other application that suggests a shift in focus from passthrough display content 48 to rendered display content 82. Control circuitry 20 may shift display 14 to a media-first mode (e.g., with brightness setting TB3 of FIG. 6) or a virtual-reality-first mode (e.g., with brightness setting TB5 of FIG. 8) by reducing the allowable brightness for passthrough display content 48 from brightness value B2 to brightness value B1 over a transition period from time t2 to time t3. This allows additional headroom for rendered display content 82. As this tone mapping transition was triggered by a user opening an application, the user is expecting an abrupt change in display appearance so little to no transition period may be needed.

From time t3 to time t4, the user continues using the media application, virtual reality application, or other application with a focus on rendered display content 82, so no changes are needed to the tone mapping parameters of display 14.

At time t4, control circuitry 20 may fade out of the media-first or virtual-reality-first mode (e.g., as a result of a movie ending, the user closing the media or virtual reality application, or other event) and may shift device 10 back to a reality-first, device-adapted mode. This involves increasing the allowable brightness for passthrough display content 48 from brightness level B1 to brightness level B2 over the time period from time t4 to time t5. The transition time needed between time t4 and time t5 may be different depending on whether the change was user-initiated (e.g., the user closing a media application or a video game) or device-initiated (e.g., a movie ending). Greater transition times may be provided for non-user-initiated changes in display content, if desired.

At time t6, the user removes device 10 from his or her head. If desired, control circuitry 20 may not impose any changes in tone mapping parameters between time period t5 to time period t6 (as shown in FIG. 9). In other scenarios, control circuitry 20 may gradually increase the available brightness for passthrough display content 48 (curve 62) between time t5 and time t6 so that the user's adaptation state can be gradually transitioned from dark-adapted to bright-adapted before the user removes device 10.

Figure 10:
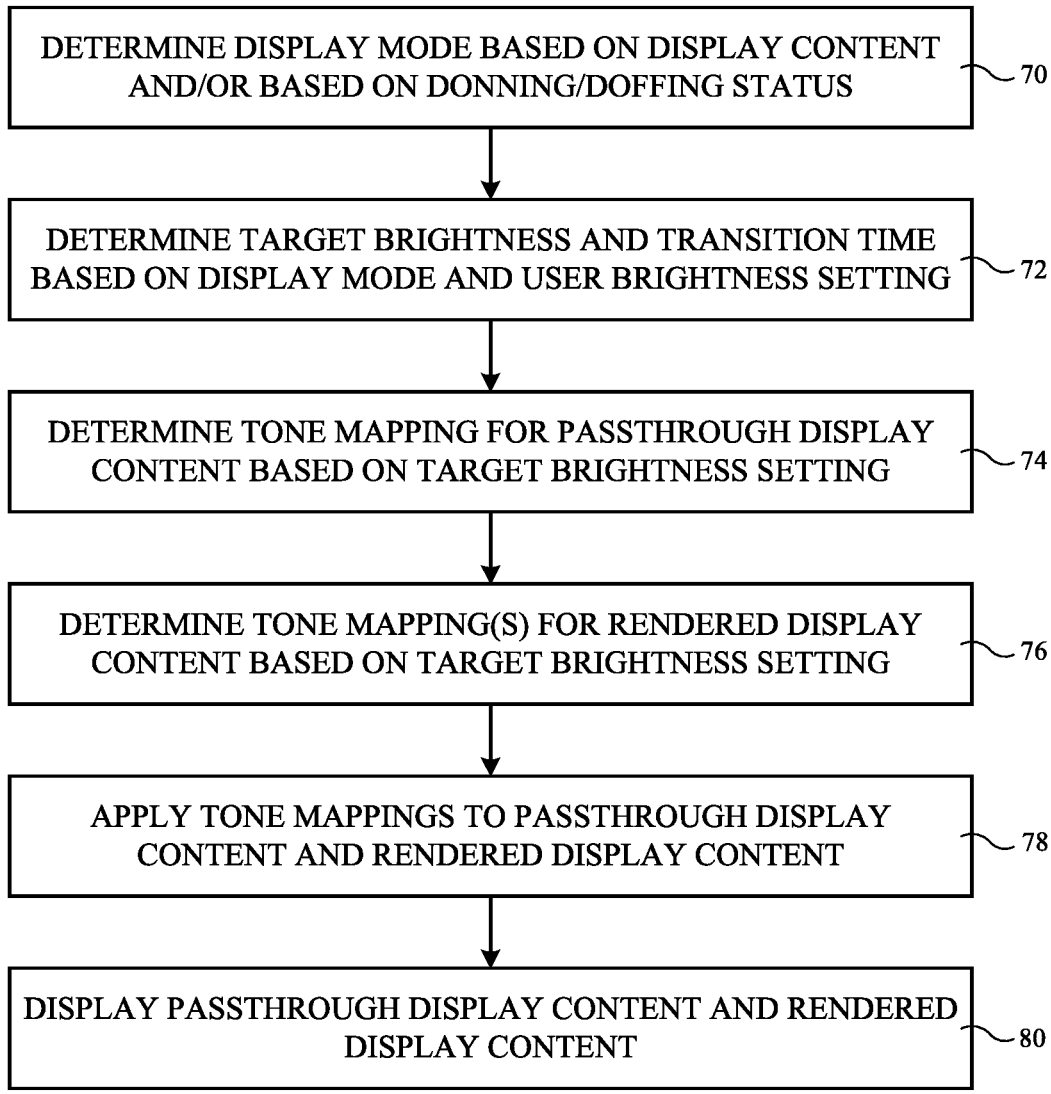
FIG. 10 is a flow chart of illustrative steps involved in operating a head-mounted device having a display with dynamic headroom in accordance with an embodiment.

FIG. 10 is a flow chart of illustrative steps involved in displaying images on display 14 while dynamically adjusting the brightness range available for passthrough display content 48 and the amount of headroom available for rendered display content 82.

During the operations of block 70, control circuitry 20 may determine a display mode for display 14 based on display content (e.g., based on what application is running on device 10, based on whether display content is mostly passthrough display content 48 or rendered display content 82, etc.), based on the user's gaze location, and/or based on donning/doffing status (e.g., based on how long the user has been wearing device 10, based on how long device 10 has been powered on, etc.). This may include selecting one of the display modes described in connection with FIGS. 4, 5, 6, 7, and 8. This is merely illustrative, however. If desired, control circuitry 20 may select from additional and/or different display modes other than those of FIGS. 4, 5, 6, 7, and 8.

During the operations of block 72, control circuitry 20 may determine a target brightness setting and a transition time, if desired, based on the selected display mode and based on a user brightness setting (e.g., a user brightness setting based on whether the user has selected a low, medium, or high brightness setting, a user brightness setting based on user preferences and/or time of day, etc.). The transition time may be determined based on whether the change in the target brightness setting is triggered by a user-initiated action (e.g., a user opening or closing an application) or a device-initiated action (e.g., a movie ending). Higher brightness settings may be used in display modes that favor real-world content (so that passthrough display content 48 can use most or all of the achievable brightness range of display 14), whereas lower brightness settings may be used in display modes that favor virtual or other rendered content (so that rendered display content 82 has sufficient headroom even in the presence of real-world content).

During the operations of block 74, control circuitry 20 may determine a tone mapping for passthrough display content 48 based on the target brightness setting determined in block 72. This may include, for example, determining a tone mapping curve for remapping luminance values of passthrough display content 48.

During the operations of block 76, control circuitry 20 may determine one or more tone mappings for rendered display content 82 based on the target brightness setting determined in block 72. This may include, for example, determining a tone mapping curve for remapping luminance values of rendered display content 82. If desired, different tone mapping curves may be determined for different types of rendered display content 82 (e.g., media 52, virtual images 56, user interface elements 50, etc.).

During the operations of block 78, control circuitry 78 may apply the tone mapping determined during the operations of block 74 to passthrough display content 48 and may apply the tone mapping determined during the operations of block 76 to rendered display content 82. Control circuitry 20 may combine the mapped display content into a combined image for displaying on display 14 during the operations of block 80. If desired, control circuitry 20 may gradually adjust the tone mappings applied to passthrough display content 48 and rendered display content 82 based on the transition times determined during the operations of block 72.

If desired, control circuitry 20 may combine passthrough display content 48 and rendered display content 82 after applying individual tone mappings to each type of display content. In other arrangements, control circuitry 20 may combine passthrough display content 48 and rendered display content 82 before applying one or more tone mappings based on the target brightness setting determined in block 72. The example of FIG. 10 is merely illustrative.

The methods and operations described above in connection with FIGS. 1-10 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., the storage circuitry within control circuitry 20 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., one or more processors in control circuitry 20). The processing circuitry may include microprocessors, application processors, digital signal processors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A head-mounted device, comprising:
a camera configured to capture a live video feed of an environment;
a display configured to display rendered display content and passthrough display content, wherein the passthrough display content includes the live video feed;
a lens through which the rendered display content and passthrough display content are viewable from an eye box; and
control circuitry configured to:
dynamically adjust an available brightness range for the passthrough display content and an amount of headroom for the rendered display content during operation of the head-mounted device; and
determine a first tone mapping for the passthrough display content and a second tone mapping for the rendered display content based on the available brightness range for the passthrough display content and the amount of headroom for the rendered display content.

2. The head-mounted device defined in claim 1 wherein the control circuitry is configured to adjust the available brightness range for the passthrough display content and the amount of headroom for the rendered display content based on which application is running on the head-mounted device.

3. The head-mounted device defined in claim 1 wherein the control circuitry is configured to adjust the available brightness range for the passthrough display content and the amount of headroom for the rendered display content based on whether the head-mounted device has been worn for a given amount of time.

4. The head-mounted device defined in claim 1 wherein the display is operable in a first display mode that favors real-world content and a second display mode that favors virtual content, and wherein the control circuitry is configured to adjust the available brightness range for the passthrough display content and the amount of headroom for the rendered display content based on whether the display is operating in the first display mode or the second display mode.

5. The head-mounted device defined in claim 4 wherein the available brightness range for the passthrough display content in the first display mode is greater than the available brightness range for the passthrough display content in the second display mode.

6. The head-mounted device defined in claim 4 wherein the amount of headroom for the rendered display content in the first display mode is less than the amount of headroom for the rendered display content in the second display mode.

7. The head-mounted device defined in claim 4 wherein the control circuitry is configured to determine a transition time for a transition between the first and second display modes.

8. The head-mounted device defined in claim 7 wherein the transition time is determined based on whether the transition between the first and second display modes is triggered by a user-initiated action or a device-initiated action.

9. The head-mounted device defined in claim 8 wherein the transition time is longer when the transition is triggered by the device-initiated action than when the transition is triggered by the user-initiated action.

10. A head-mounted device, comprising:
a camera configured to capture images of an environment;
a display configured to display passthrough display content that includes the images of the environment;
a lens through which the passthrough display content is viewable from an eye box; and
control circuitry configured to gradually reduce a maximum available brightness for the passthrough display content from a first value to a second value over a given time period, wherein the first value is used when the head-mounted device is donned and the second value is used after the given time period has passed, and wherein the first value is less than a maximum achievable brightness of the display.

11. The head-mounted device defined in claim 10 wherein the display is configured to overlay user interface elements onto the passthrough display content and wherein the user interface elements are permitted to use a brightness range that extends to the maximum achievable brightness of the display.

12. The head-mounted device defined in claim 10 wherein the display is configured to overlay virtual images onto the passthrough display content and wherein the virtual images are permitted to use a brightness range that extends to the maximum achievable brightness of the display.

13. The head-mounted device defined in claim 10 wherein the display is configured to overlay high-dynamic-range media onto the passthrough display content and wherein the high-dynamic-range media is permitted to use a brightness range that extends to the maximum achievable brightness of the display.

14. The head-mounted device defined in claim 10 wherein the control circuitry is configured to reduce the maximum available brightness for the passthrough display content from the second value to a third value in response to an application being launched on the display.

15. A head-mounted device, comprising:
a camera configured to capture live video of a real-world environment;
a display configured to:
display passthrough display content that includes the live video of the real-world environment; and
overlay virtual images onto the passthrough display content;
a lens through which the passthrough display content and the virtual images are viewable from an eye box; and
control circuitry configured to:
operate the display in a first display mode in which the passthrough display content has a first maximum allowable brightness and the virtual images have a first amount of headroom; and
operate the display in a second display mode in which the passthrough display content has a second maximum allowable brightness and the virtual images have a second amount of headroom, wherein the first maximum allowable brightness is greater than the second maximum allowable brightness and the first amount of headroom is less than the second amount of headroom.

16. The head-mounted device defined in claim 15 wherein the control circuitry automatically transitions the display from the first display mode to the second display mode after a given period of time passes from an initial donning of the head-mounted device.

17. The head-mounted device defined in claim 15 wherein the control circuitry transitions the display from the first display mode to the second display mode in response to a virtual reality application launching on the head-mounted device.

18. The head-mounted device defined in claim 15 wherein the control circuitry transitions the display from the second display mode to the first display mode in response to a movie ending on the display.

19. The head-mounted device defined in claim 15 wherein the first maximum allowable brightness is less than a maximum achievable brightness of the display.

* * * * *